United States Patent [19]
Harding

[11] Patent Number: 5,992,348
[45] Date of Patent: Nov. 30, 1999

[54] CHEW-PROOF ANIMAL BED

[76] Inventor: Michael S. Harding, 1001 Paca La., Annapolis, Md. 21403

[21] Appl. No.: 09/041,116

[22] Filed: Mar. 11, 1998

[51] Int. Cl.[6] .............................. A01K 1/035; A47C 17/64
[52] U.S. Cl. ............................................... 119/28.5; 5/110
[58] Field of Search .................................. 119/28.5, 525, 119/528; 5/110, 111, 114

[56] References Cited

U.S. PATENT DOCUMENTS

| | | | |
|---|---|---|---|
| 2,980,058 | 4/1961 | Hoffman | 119/28.5 |
| 3,565,040 | 2/1971 | Pohl | 119/28.5 |
| 3,956,781 | 5/1976 | Reemelin | 5/110 |
| 5,150,980 | 9/1992 | Lin | 5/110 |
| 5,339,471 | 8/1994 | Lanzara | 5/110 |
| 5,577,465 | 11/1996 | Cook | 119/28.5 |

FOREIGN PATENT DOCUMENTS 2423350  11/1975  Germany .............................. 119/28.5

*Primary Examiner*—Peter M. Poon
*Assistant Examiner*—Elizabeth Shaw
*Attorney, Agent, or Firm*—Donald A. Kettlestrings

[57] ABSTRACT

An animal bed or cot for dogs or other pets includes a frame-supported fabric upon which the dog rests. The frame includes a plurality of pipes connected together at corners by three-way elbow fittings. Each frame pipe defines a narrow slit with an interior awning track extending along the length of each pipe. The fabric is inaccessible to chewing by attachment of the fabric to the awning tracks inside of the pipes. The diameter of the frame pipes is sized to prevent a dog from getting its mouth around the frame pipes and into the fabric. The fabric also fits inside of the elbow fittings so there are no open gaps between the frame and fabric to permit a dog to bite the fabric.

21 Claims, 4 Drawing Sheets

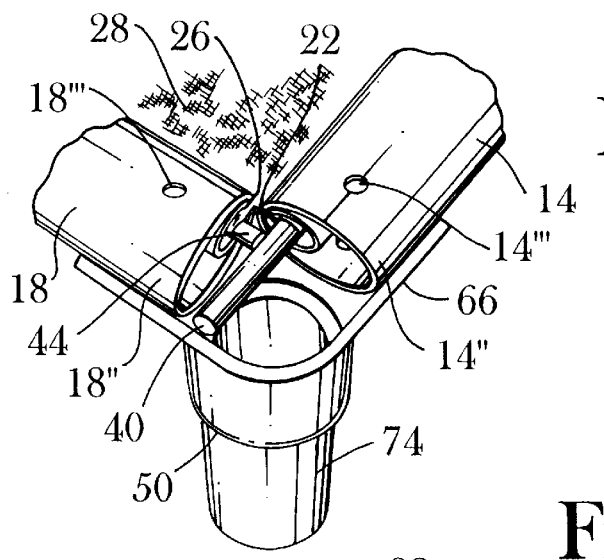
Fig. 2
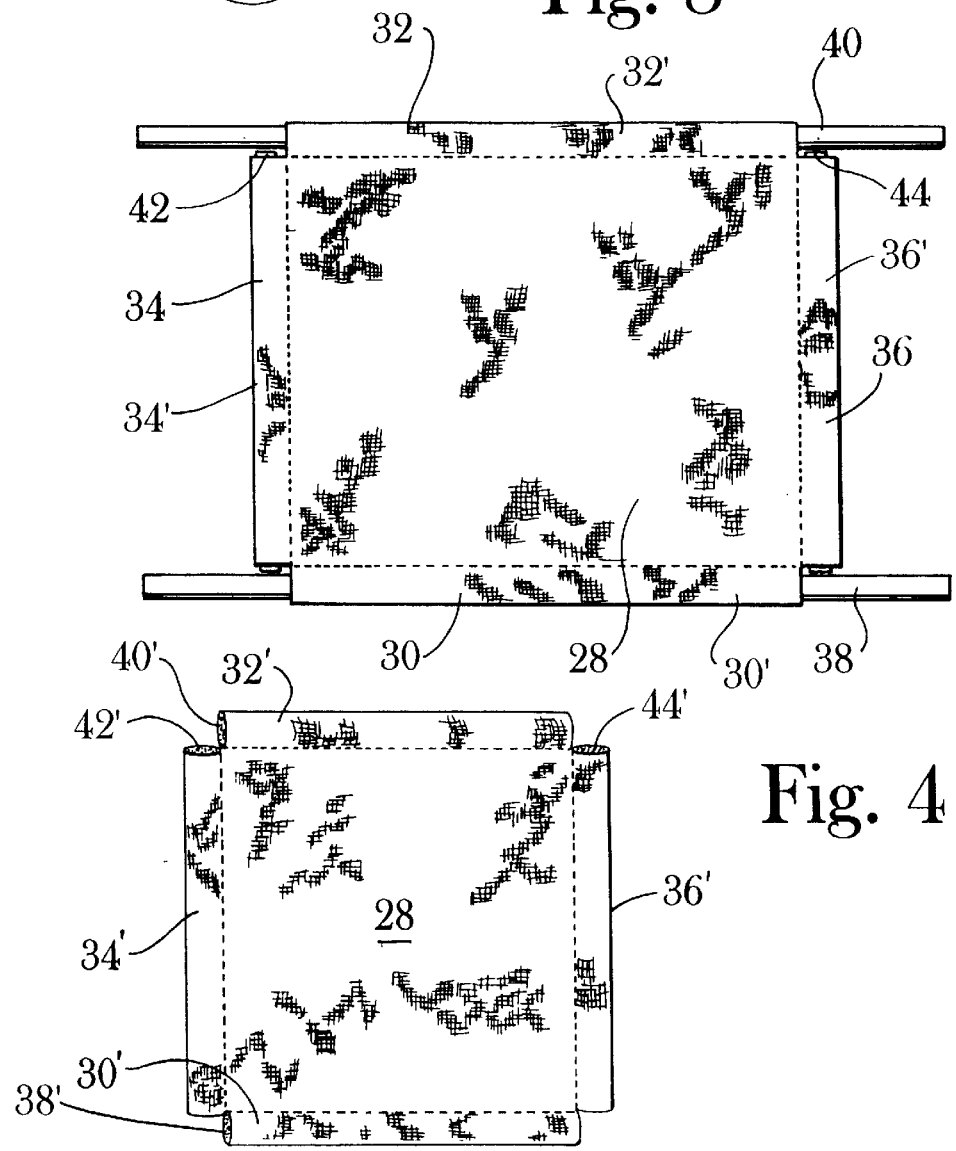
Fig. 3
Fig. 4

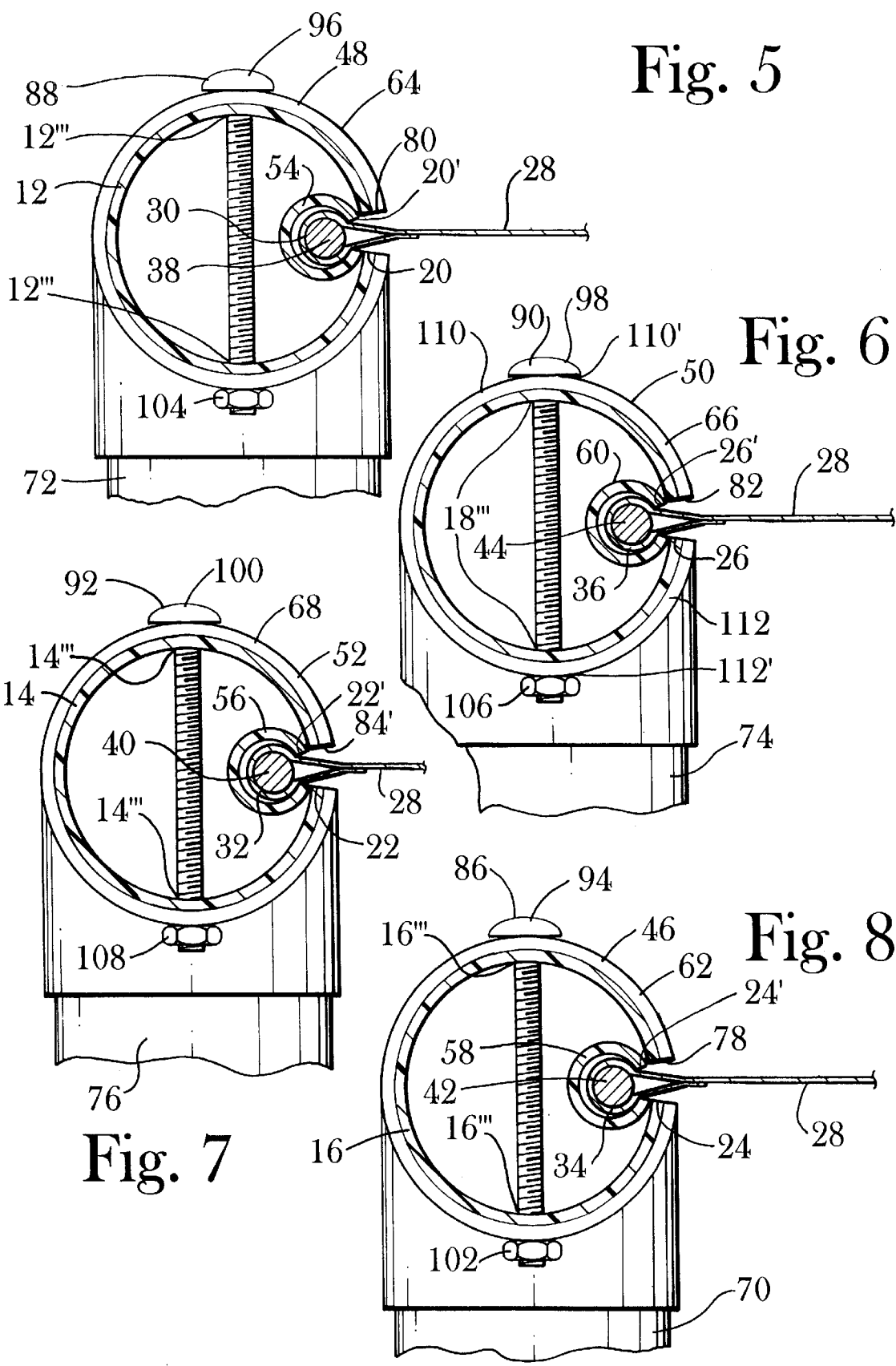

CHEW-PROOF ANIMAL BED

BACKGROUND OF THE INVENTION

This invention relates to an animal bed or cot for dogs or other small animals and more particularly to an animal bed or cot having fabric upon which the dog or other animal rests and wherein the fabric is inaccessible to chewing.

The flooring in most kennels is concrete, wood, vinyl or other hard surface which is often uncomfortable for animals. The lack of a soft resting place can also aggravate arthritic conditions and other joint problems, including hip dysplasia. The lack of a soft resting place can also cause calluses and wear the hair off of elbows, which is a particular problem for show dog owners.

It is, therefore, desirable to provide comfortable bedding for dogs or other animals. It is well known, however, among boarding kennel operators, dog breeders, veterinarians, show dog and hunting dog owners, and anyone who keeps dogs in a kennel type enclosure, that dogs so confined will frequently chew or attempt to tear apart whatever type of bedding or material is put into the enclosure to provide for their comfort and warmth. In particular, young dogs and, within certain breeds, dogs of all ages may attempt to rip apart anything within their reach, whether soft or hard. Thus, many dogs will destroy that which is there for their own comfort.

If towels, carpets, blankets or similar material is used for bedding in a kennel, they must be laundered frequently. In the case of boarding kennels, bedding must be laundered daily. In a kennel with a large number of enclosures, commercial grade washing and drying equipment is often required.

It is, therefore, an object of the present invention to provide a soft resting place on a bed-type apparatus wherein the fabric upon which the dog or other animal rests is virtually impossible to chew or to be torn apart by the animal's teeth.

Another object is to provide an animal bed or cot which is protected from chewing by the dog or other animal and which needs replacing far less often than a non-protected bed or cot.

A further object of the invention is the provision of an animal bed or cot for dogs or other animals which is easy to maintain and clean at a lower cost than conventional animal bedding.

Still another object is to provide an animal bed or cot which can be quickly and easily washed or cleaned without being disassembled by using a hose or pail of water with a brush and detergent.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects, the present invention provides an animal bed or cot, comprising: a plurality of rigid, hollow, tubular elements or pipes of predetermined lengths, each of the tubular elements or pipes defining first and second ends and a first slitted opening of predetermined width extending substantially along the entire length of each of the tubular elements between the first and second ends; a fabric support defining a plurality of edges and defining a thickness less than the predetermined width of the slitted openings; a plurality of elongated members, rods or ropes positioned in predetermined relationship, respectively, with each of the support edges, each of the elongated members defining a thickness greater than the predetermined width of the slitted openings; the elongated members positioned, respectively, within the hollow, tubular elements or pipes with the fabric support in a substantially flat shape and with the fabric support extending through the slitted openings; and means, such as three-way elbow fittings, connected to the tubular elements or pipes for supporting the bed on a floor or other horizontal surface.

To further achieve these and other objects, the present invention may also provide for an animal bed including: a plurality of hollow, tubular sleeve members or awning tracks of predetermined lengths, one each positioned within and connected to each of the hollow, tubular elements or pipes; each of the sleeve members or awning tracks defining a second slitted opening of predetermined width extending substantially along the entire length of each of the sleeve members or awning tracks; the second slitted openings of the sleeve members or awning tracks positioned in substantial alignment with respective of the first slitted openings of the tubular elements or pipes; and the elongated members, rods or ropes positioned within the sleeve members or awning tracks with the fabric support extending through the first and second slitted openings.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

FIG. 2 is a fragmentary perspective view showing a corner of the bed, partially disassembled;

FIG. 3 is a top plan view of one embodiment of the support used with the bed;

FIG. 4 is a top plan view of another embodiment of the support used with the bed;

FIG. 5 is a fragmentary cross-sectional view taken along the line 5—5 in FIG. 1 and looking in the direction of the arrows;

FIG. 6 is a fragmentary cross-sectional view taken along the line 6—6 in FIG. 1 and looking in the direction of the arrows;

FIG. 7 is a fragmentary cross-sectional view taken along the line 7—7 in FIG. 1 and looking in the direction of the arrows;

FIG. 8 is a fragmentary cross-sectional view taken along the line 8—8 in FIG. 1 and looking in the direction of the arrows;

DESCRIPTION OF THE PREFERRED EMBODIMENT

Figure 1:
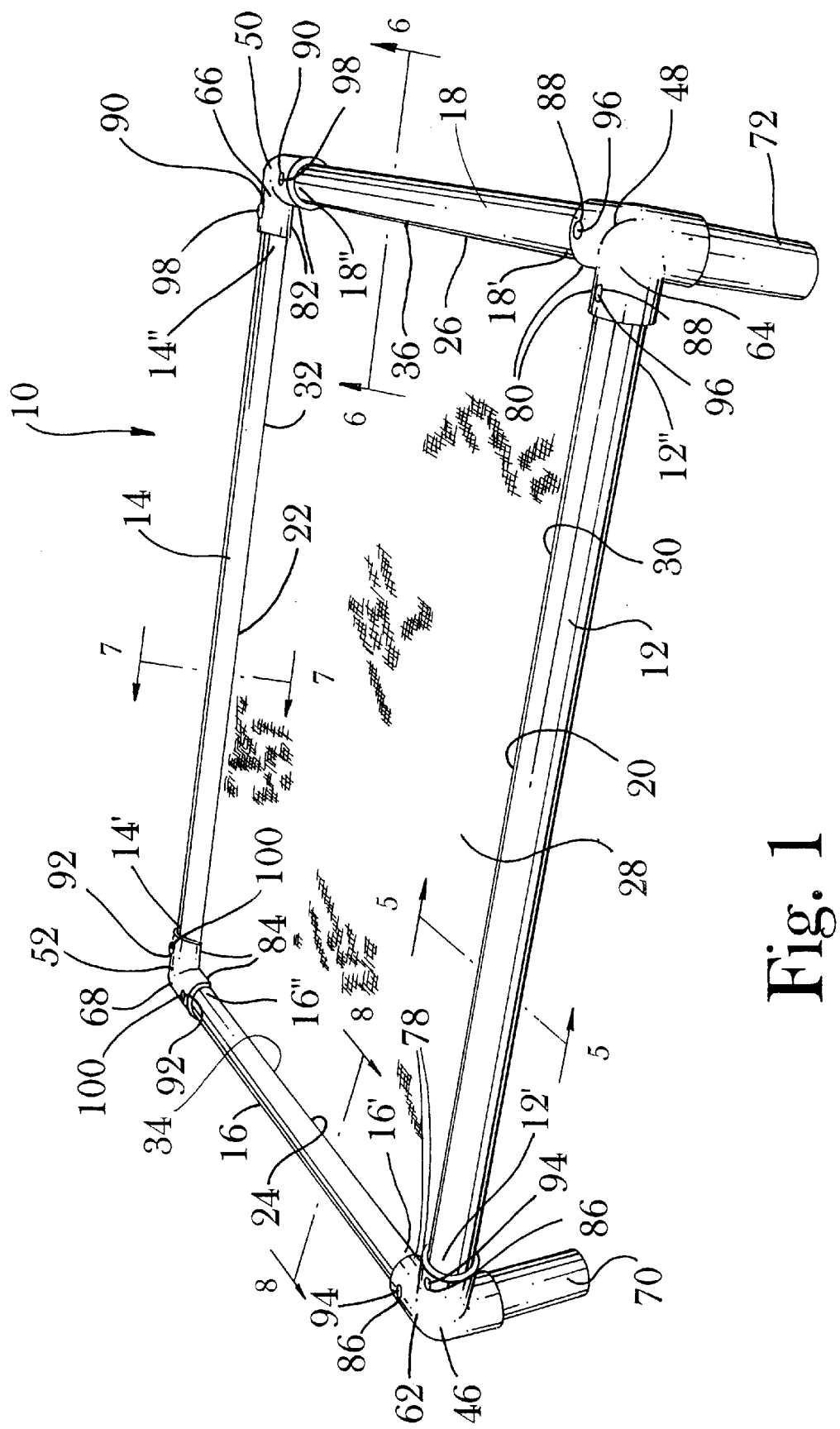
FIG. 1 is a perspective view of the animal bed.

With reference now to the drawings, wherein like reference characters designate like or corresponding parts throughout the several views, there is shown an animal bed or cot 10 which includes a plurality of rigid, hollow, tubular elements or pipes 12, 14, 16, 18 of predetermined lengths. Each of tubular elements 12–18 defines first and second ends 12', 12"; 14', 14"; 16', 16"; and 18', 18", respectively. Each of tubular elements or pipes also defines a narrow slitted opening 20, 22, 24, 26, respectively, of predetermined width extending along the entire length of each of tubular elements or pipes 12–18.

Bed 10 further includes a support 28 defining a plurality of edges 30, 32, 34, 36 and defining a thickness less than the width of openings 20–26.

Bed 10 also includes a plurality of elongated members 38, 40, 42, 44 positioned in predetermined relationship, respectively, with each of support edges 30–36. Each of elongated members 38–44 defines a thickness greater than the width of slitted openings 20–26.

Elongated members 38–44 are positioned, respectively, within hollow, tubular elements 12–18 with support 28 in a flat shape and with support 28 extending through slitted openings 20–26.

Bed 10 further includes means 46, 48, 50, 52 connected to tubular elements or pipes 12–18 for supporting bed 10 on a floor or other horizontal surface.

A preferred embodiment of animal bed 10 further includes a plurality of hollow, tubular sleeve members or awning tracks 54, 56, 58, 60 of predetermined lengths, one each positioned within and connected to each of hollow, tubular elements or pipes 12–18, respectively. Each of sleeve members or awning tracks 54–60 defines a second slitted opening 20', 22', 24', 26', respectively, of predetermined width which extends along the entire length of each of sleeve members 54–60. Slitted openings 20'–26' are positioned in alignment with respective of slitted openings 20–26, (see FIGS. 5–8) and elongated members 38–44 are positioned within sleeve members 54–60, respectively, with support 28 extending through first and second slitted openings 20–26 and 20'–26'.

Sleeve members or awning tracks 54–60 and tubular elements or pipes 12–18 are rigid and are comprised of metal, such as aluminum, or plastic, such as polyvinylchloride. Tubular elements 12–18 having sleeve members 54–60 positioned as described within the tubular elements are conventionally known awning tracks. One example of such an awning track is sold by Taco Metals as part no. A42-0140, which is a one inch schedule forty aluminum pipe with awning track.

Supporting means 46–52 each includes means 62, 64, 66, 68 for removably receiving and holding tubular elements 12–18 therein. Supporting means 46–52 also include supporting legs 70, 72, 74, 76, each of legs 70–76 conventionally connected to one of receiving and holding means 62–68, respectively.

In accordance with the invention, each of receiving and holding means 62–68 defines additional slitted openings 78, 80, 82, 84 which are in alignment with adjacent ones of slitted openings 20–26 and 20'–26'. Support 28 extends through slitted openings 20–26, 20'–26' and 78–84.

Further in accordance with the invention, bed 10 includes means 86, 88, 90, 92 in operative relationship with tubular elements 12–18 and with receiving and holding means 62–68 for fastening predetermined of tubular elements 12–18 to predetermined of receiving and holding means 62–68, as illustrated in the drawings. Fastening means 86–92 are preferably threaded bolts 94, 96, 98, 100 and nuts 102, 104, 106, 108.

Figure 9:
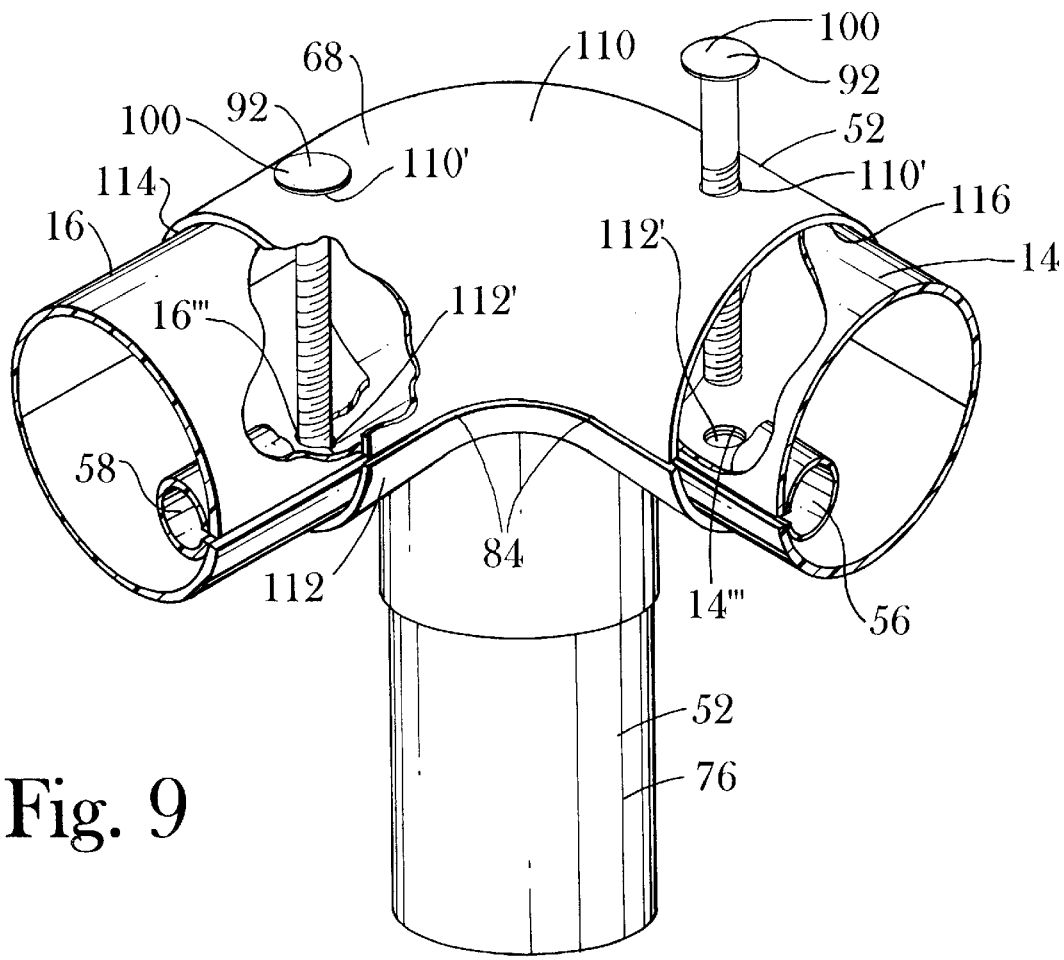
FIG. 9 is a fragmentary perspective view of a corner of the bed.

Each of receiving and holding means 62–68 is identical, and the specific configuration and connections will be discussed herein only with respect to receiving and holding means 68, shown in FIG. 9. Receiving and holding means 68 includes an upper elbow element 110 and a lower elbow element 112 which when positioned together form circular openings 114, 116 for receiving tubular elements or pipes 16, 14, respectively, therein. Each of tubular elements or pipes 12–18 defines adjacent to each end thereof two diametrically opposed apertures 12'", 14'", 16'", 18'", respectively, (a total of four apertures in each of tubular elements 12–18). Bolts 100 are positioned through opposed apertures 110', 112' within receiving and holding means 68 and through two diametrically opposed apertures 14'", and through two diametrically opposed apertures 16'" within each of tubular elements 14, 16 when bed 10 is assembled. Nuts 108 are threaded onto ends of bolts 100 to tighten the bolts in position. (See FIG. 7).

Receiving and holding means 62–68 are preferably three-way elbow fittings. Supporting legs 70–76 fit into the vertical receptacles of the three-way fittings, and tubular elements or pipes 12–18 fit into the two horizontal receptacles of the three-way fittings. (See FIG. 9).

In accordance with the invention, each of support edges 30–36 defines an elongated, hollow tube 30', 32', 34', 36', respectively, and elongated members 38–44 are positioned, respectively, within tubes 30'–36'. Elongated members 38–44 may be plastic or metal rods (plastic is preferred) which slideably are fitted into and through tubes 30'–36'. Alternatively, elongated members 38'–44' are preferably ropes which are sewn or otherwise attached into hollow tubes 30'–36' (see FIG. 4). For economy of manufacture, the ropes may be sewn or otherwise attached to outer edges of fabric support 28 without requiring use of tubes 30'–36'.

Support 28 is preferably a flexible fabric, such as a thin canvas type material which is easily cleaned and durable.

The frame formed by tubular elements or pipes 12–18 is preferably rectangular in shape, but other shapes can be used. When the frame is rectangular in shape and when elongated members 38–44 are plastic rods, it is preferred that two opposed ones of the plastic rods 38, 40 be of sufficient length to contact inside surfaces of three-way elbow fittings 62, 64 and 66, 68, respectively. Thus, rods 38, 40 are held in fixed position when the frame has been assembled. Plastic rods 42, 44 are preferably of lengths to abut rods 38, 40 to keep rods 42, 44 in fixed position between rods 38, 40 when the frame has been assembled. See FIGS. 2 and 3.

The chew proof feature of bed 10 is achieved by holding fabric support 28 in position from the inside of pipes 12–18 in a manner similar to the way a mainsail attaches to the boom or mast on a sail boat. Fabric 28 is inaccessible to chewing by dogs or other pets instead of having fabric support 28 looped around the outside of frame pipes 12–18.

When bed 10 is assembled, fabric 28 is held fast in a flat, taut, horizontal position. The diameter of pipes 12–18 is of sufficient size to make it virtually impossible for a dog or other pet to get its mouth around the frame or pipes 12–18 and into fabric 28. For example, the outside diameter of pipes 12–18 may preferably be from one and one-half inches to one and three-quarters inches. The configuration of bed 10 also enables fabric 28 to fit completely inside three-way corner elbow fittings 62–68 so there are no open gaps between fabric 28 and the frame formed by pipes 12–18 to allow a dog to bite the fabric.

Figure 10:
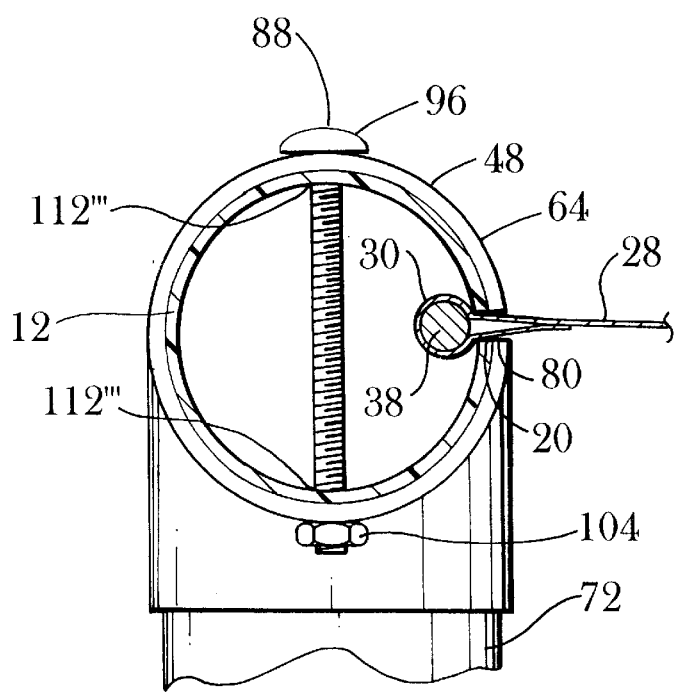
FIG. 10 is a fragmentary cross-sectional view taken along the line 5—5 in FIG. 1 and looking in the direction of the arrows showing an alternative configuration of the invention.

FIG. 10 shows an alternate configuration of the invention wherein sleeve members 54–60 are eliminated. It is preferred, however, that sleeve members 54–60 be included to provide greater rigidity and stability to tubular elements 12–18.

The invention in its broader aspects is not limited to the specific details shown and described, and departures may be made from such details without departing from the principles of the invention and without sacrificing its chief advantages.

What is claimed is:

1. An animal bed, comprising:
   a plurality of rigid, hollow, tubular elements of predetermined lengths, each of said tubular elements defining first and second ends and a first slitted opening of predetermined width extending substantially along the entire length of each of said tubular elements between said first and second ends;
   a support defining a plurality of edges and defining a thickness less than said predetermined width of said slitted openings;
   a plurality of elongated members positioned in predetermined contacting relationship, respectively, with each of said support edges, each of said elongated members defining a thickness greater than said predetermined width of said slitted openings;
   said elongated members positioned, respectively, within said hollow tubular elements with said support in a substantially flat shape and with said support extending through said slitted openings; and
   means connected to said tubular elements for supporting said bed on a floor or other horizontal surface.

2. An animal bed as in claim 1 further including:
   a plurality of hollow, tubular sleeve members of predetermined lengths, one each positioned within and connected to each of said hollow, tubular elements;
   each of said sleeve members defining a second slitted opening of predetermined width extending substantially along the entire length of each of said sleeve members;
   said second slitted openings of said sleeve members positioned in substantial alignment with respective of said first slitted openings of said tubular elements; and
   said elongated members positioned within said sleeve members with said support extending through said first and second slitted openings.

3. An animal bed as in claim 2 wherein said sleeve members are rigid.

4. An animal bed as in claim 2 wherein said supporting means include:
   means for removably receiving and holding said tubular elements therein; and
   a plurality of supporting legs, each of said legs connected to one of said receiving and holding means.

5. An animal bed as in claim 4 wherein each of said receiving and holding means defines additional slitted openings which are in substantial alignment with predetermined width of said first and second slitted openings, and wherein said support extends through said first and second slitted openings and through said additional slitted openings.

6. An animal bed as in claim 5 further including means in operative relationship with said tubular elements and with said receiving and holding means for fastening said tubular elements to said receiving and holding means.

7. An animal bed as in claim 2 wherein each of said support edges defines an elongated, hollow tube and wherein said elongated members are positioned, respectively, within said tubes.

8. An animal bed as in claim 7 wherein said elongated members are plastic rods.

9. An animal bed as in claim 7 wherein said elongated members are ropes.

10. An animal bed as in claim 9 wherein said ropes are sewn, respectively, into said hollow tubes.

11. An animal bed as in claim 2 wherein said support is comprised of flexible fabric.

12. An animal bed as in claim 2 wherein said supporting means include a three-way elbow fitting.

13. An animal bed as in claim 1 wherein said supporting means include:
   means for removably receiving and holding said tubular elements therein; and
   a plurality of supporting legs, each of said legs connected to one of said receiving and holding means.

14. An animal bed as in claim 13 wherein each of said receiving and holding means defines additional slitted openings which are in substantial alignment with predetermined widths of said first slitted openings, and wherein said support extends through said first slitted openings and through said additional slitted openings.

15. An animal bed as in claim 14 further including means in operative relationship with said tubular elements and with said receiving and holding means for fastening said tubular elements to said receiving and holding means.

16. An animal bed as in claim 1 wherein each of said support edges defines an elongated, hollow tube and wherein said elongated members are positioned, respectively, within said tubes.

17. An animal bed as in claim 16 wherein said elongated members are plastic rods.

18. An animal bed as in claim 16 wherein said elongated members are ropes.

19. An animal bed as in claim 18 wherein said ropes are sewn, respectively, into said hollow tubes.

20. An animal bed as in claim 1 wherein said support is comprised of flexible fabric.

21. An animal bed as in claim 1 wherein said supporting means include a three-way elbow fitting.

* * * * *